United States Patent
Chevalier et al.

(10) Patent No.: US 7,346,310 B2
(45) Date of Patent: Mar. 18, 2008

(54) METHOD FOR VERIFYING ANTI-SCRAMBLING EFFICIENCY OF A COMMUNICATION SYSTEM

(75) Inventors: Pascal Chevalier, Courbevoie (FR);
Béatrice Col, Decatur, GA (US);
Fréderique Lasnier, Paris, GA (US)

(73) Assignee: Thales, Neuilly-sur-Seine (FR)

( * ) Notice: Subject to any disclaimer, the term of this patent is extended or adjusted under 35 U.S.C. 154(b) by 240 days.

(21) Appl. No.: 10/534,523

(22) PCT Filed: Nov. 21, 2003

(86) PCT No.: PCT/FR03/03451
§ 371 (c)(1),
(2), (4) Date: May 11, 2005

(87) PCT Pub. No.: WO2004/048996
PCT Pub. Date: Jun. 10, 2004

(65) Prior Publication Data
US 2006/0046636 A1    Mar. 2, 2006

(30) Foreign Application Priority Data
Nov. 22, 2002   (FR)  ................................. 02 14685

(51) Int. Cl.
*H04B 7/00*    (2006.01)
*H04B 17/00*   (2006.01)
*H04B 1/04*    (2006.01)
(52) U.S. Cl. ...................... 455/1; 455/501; 455/67.13; 455/114.3
(58) Field of Classification Search ................ 455/501, 455/67.13, 114.3
See application file for complete search history.

(56) References Cited

U.S. PATENT DOCUMENTS 5,675,581 A * 10/1997 Soliman ..................... 370/252

(Continued)

OTHER PUBLICATIONS

Matsumoto Y et al: "Interference Suppression by adaptive beamforming of satellite-bornephased-array antennas" Electronic & Communications in Japan, Part I-Communications, Scripta Technica. New York, US.

*Primary Examiner*—Lana Le
*Assistant Examiner*—Bobbak Safaipour
(74) *Attorney, Agent, or Firm*—Lowe Hauptman & Berner, LLP

(57) ABSTRACT

A method for the verification of anti-jamming in a communications system comprises several sensors or adaptive antennas, comprising at least the following steps:

estimating the mean power $\pi;\hat{}_y$ of the output of the communications system, estimating the respective power values $P_u$ or $P'u$, of a station u, the antenna noise $P_a$ or $P'a$, the thermal noise $P_T$, or $P'_T$, estimating at least one of the following ratios:

$$J_{tot}/S_{tot} = \left(\sum_{p=1}^{P} P_p\right) / \left(\sum_{u=1}^{U} P_u\right)$$

$$J_{tot}/S_u = \left(\sum_{p=1}^{P} P_p\right) / P_u$$

$$J_u/S_u = \left(\sum_{p=1}^{P} P_{pu}\right) / P_u$$

comparing at least one of the three ratios with a threshold value.

10 Claims, 4 Drawing Sheets

U.S. PATENT DOCUMENTS

| | | | |
|---|---|---|---|
| 6,131,013 A * | 10/2000 | Bergstrom et al. | 455/63.1 |
| 6,157,817 A | 12/2000 | Kopito et al. | |
| 6,236,363 B1 | 5/2001 | Amin et al. | |
| 6,415,223 B1 * | 7/2002 | Lin et al. | 701/208 |
| 6,546,256 B1 * | 4/2003 | Maloney et al. | 455/404.2 |
| 6,779,752 B1 * | 8/2004 | Ratkovic | 244/3.15 |
| 6,813,263 B1 * | 11/2004 | Margherita | 370/347 |
| 6,931,235 B2 * | 8/2005 | Kline et al. | 455/67.11 |
| 6,959,171 B2 * | 10/2005 | Tsien et al. | 455/67.11 |
| 7,016,670 B2 * | 3/2006 | Agin | 455/423 |
| 7,058,368 B2 * | 6/2006 | Nicholls et al. | 455/114.2 |
| 7,154,959 B2 * | 12/2006 | Erceg et al. | 375/267 |

* cited by examiner

METHOD FOR VERIFYING ANTI-SCRAMBLING EFFICIENCY OF A COMMUNICATION SYSTEM

CROSS-REFERENCE TO RELATED APPLICATIONS

The present Application is based on International Application No. PCT/FR2003/003451, filed on Nov. 21, 2003, which in turn corresponds to FR 02/14685 filed on Nov. 22, 2002, and priority is hereby claimed under 35 USC §119 based on these applications. Each of these applications are hereby incorporated by reference in their entirety into the present application.

BACKGROUND OF THE INVENTION

The invention relates to a method to verify the efficiency of anti-jamming by antenna processing in one or more space communications on board a geostationary satellite, as well as its implementation from the ground.

The invention can be applied in anti-jamming for space telecommunications and is a tool of assistance in optimizing the planning of connection bit rates in a theatre of operations depending on jamming conditions.

At present, anti-jamming by antenna processing is the most efficient way to protect one or more space or radio communications links against hostile jamming units. Anti-jamming by antenna processing consists in implementing what is called an adaptive antenna at reception. The chief property of this adaptive antenna is that it matches its radiation pattern in real time to the received signal, setting pattern holes toward the jamming units while at the same time maintaining sufficient gain in the direction of the link or links to be protected as can be seen in FIG. 1. This result can be obtained from a minimum amount of information on the links to be protected such as knowledge of the position of the transmitters, the theatre of operations or the learning sequences conveyed by the transmitters without a priori knowledge of the jamming units present. However, in certain cases, the a priori estimation of the positions of the jamming units may be advantageously used by the adaptive antenna so as to simplify the processing operations.

FIG. 2 shows an adaptive antenna with a purely spatial structure. It is formed by an network of sensors Ci or radiating elements, a set of digital or analog reception chains CRi, downstream from the sensors, a set of adaptive filters Fi with one complex coefficient per filter whose role is to carry out the phase and amplitude weighting of the signals coming from the difference sensors before summation, and an adaptive algorithm A whose role is to carry out the real-time matching of the coefficients of the adaptive filters so as to optimize a criterion as a function of the information available a priori on the signals of interest and therefore the application.

The adaptive antenna can be implemented in an analog, digital or hybrid way. In the first case, the weightings are computed and applied analogically while, in the second case, they are computed and applied digitally. In the third case, the set of complex weightings is computed digitally and copied analogically before summation.

For a digital implantation, the adaptive filters are formed by complex weighting operations whereas, for an analog implantation, these filters are formed by the cascade connection of a phase-shifter and a variable attenuator or a hybrid quadrature as can be shown in FIG. 3. In the context of space communications, when there are no jamming units, the set of weightings synthesizes a coverage (or a spot) on the earth, centered on a given point and having a certain surface area as can be seen in FIG. 4. In general, the coverage is characterized especially by the 3 dB width of the beam formed by the set of weightings. According to the size of this 3 dB lobe width or width of the illuminated surface area of the earth, we may speak of theatre, regional or global coverage, the latter corresponding to coverage of the entire earth. The working stations are deployed inside a coverage considered for a given mission and communicate together and/or with the mainland by satellite.

A jamming operation from one or more terrestrial regions jams the useful uplinks (from the earth to a satellite) and it is the role of the adaptive antenna precisely to carry out anti-jamming on the links by creating antenna pattern holes toward the jamming units, located outside or within the coverage and picked up respectively by the minor or major lobes of the antenna.

SUMMARY OF THE INVENTION

The invention relates to a method for the verification of the efficiency of the anti-jamming, by adaptive antenna, of the uplink of one or more space communications links as well as its implementation from the ground.

The invention relates to a method of anti-jamming in a communications system comprising several sensors or adaptive antennas. It is characterized by the fact that it comprises at least the following steps:

estimating the mean power of the output of the communications system, estimating the respective power values Pu or P'u, of a station u, the antenna noise Pa or P'a, the thermal noise PT, or P"T, estimating at least one of the following ratios:

$$J_{tot}/S_{tot} = \left(\sum_{p=1}^{P} P_p\right) \bigg/ \left(\sum_{u=1}^{U} P_u\right) \text{ with} \quad (22)$$

p = the jamming unit

= sum of the power values of the residual sum/sum of the power values of the stations on the reception band B.

$$J_{tot}/S_u = \left(\sum_{p=1}^{P} P_p\right) / P_u \quad (23)$$

= sum of the power values of the residual jamming units/power of the station u in the reception band B.

$$J_u/S_u = \left(\sum_{p=1}^{P} P_{pu}\right) / P_u \quad (24)$$

With Ppu=power of the jamming unit p in the reception band Bu.

comparing at least one of the three ratios with a threshold value.

The invention also relates to a system for the verification of anti-jamming in a communications system comprising several sensors or adaptive antennas, and a piloting device on the ground. It is characterized by the fact that it comprises at least the following elements: for a verification by channel, from the ground and for a reception band B, a computer integrated into the piloting device and an onboard computer, the two computers being programmed to execute the following steps:
Communications Channel Power Measurement: Onboard function parameterized from the ground by the Onboard Param VAA function,
VAA GAIN: Ground function Sol,
Communications channel power measurement: onboard function,
VAA Processing: Ground function.

According to another alternative embodiment, the invention also relates to a system for the verification of anti-jamming in a communications system comprising several sensors or adaptive antennas, a piloting device on the ground comprising at least the following elements:

For a verification by stations, an onboard computer and a ground computer, the computers being programmed to execute the following functions:
Communications Channel Power Measurement: onboard function parameterized from the ground by the Onboard Param VAA function,
VAA Gain: ground function,
Acquisition of Communications Channel: onboard function parameterized from the ground by the function Onboard Param VAA,
VAA Processing: ground function.

The invention can be applied for example in space communications systems.

With the proposed method, it is possible at all times to know whether or not the anti-jamming applied is effective. If it is not effective, the information coming from the method modifies the anti-jamming characteristics (choice of the number of type of auxiliary channels in the case of an OLS (Minor Lobe Opposition) type of processing, alternative parametrization of a pre-synthesis of zeros (PRS) when a piece of a priori information on the position of the jamming units is available etc) to increase its efficiency.

BRIEF DESCRIPTION OF THE DRAWINGS

Other features and advantages of the invention shall appear more clearly from the following description given by way of an illustration that in no way restricts the scope of the invention, along with the appended figures of which.

MORE DETAILED DESCRIPTION

The method according to the invention uses especially the information, assumed to be available a priori, on the position and the Equivalent Radiated Isotropic Power (ERIP) sent out by the working stations working within the coverage, also called theatre information. It furthermore makes use of the characteristics of the active antenna used onboard the satellite and especially knowledge of the positions and responses of the RE (Radiating Elements) for each direction of space and each polarization of the incident field, the set of weightings used for the anti-jamming, the gain and the equivalent noise temperatures of the analog or a digital reception chains downstream from the sensors and, for an analog or hybrid layout of the set of weightings, that of the digitization chain if any at output of the antenna.

Before explaining the method according to the invention, a few reminders are given on the signals in a communications system with anti-jamming.

A. Signals at Output of a Communications BFN (Beam-forming Network)

Figure 1:
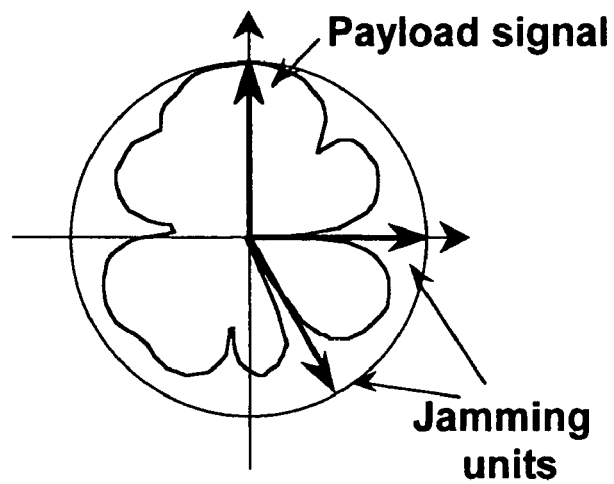
FIG. 1 shows a radiation pattern of the antenna after anti-jamming.
Figure 2:
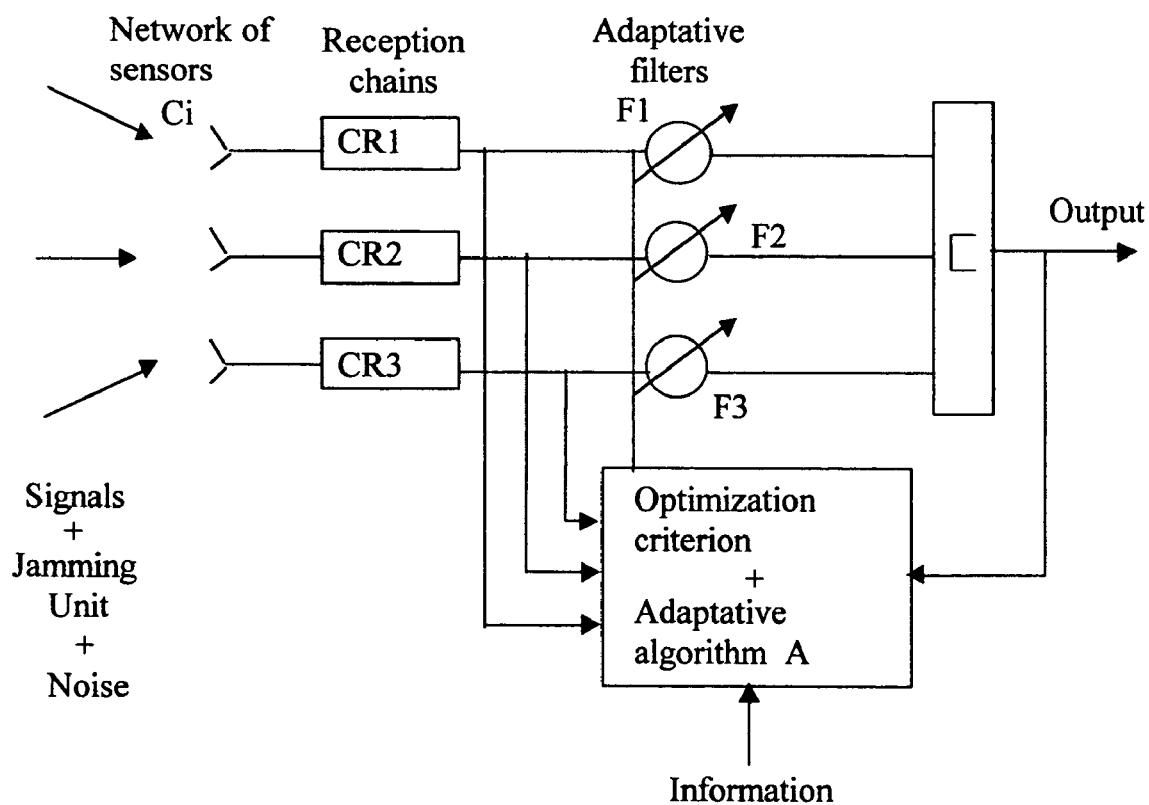
FIG. 2 is a functional diagram of a spatial-structure adaptive antenna.
Figure 3:
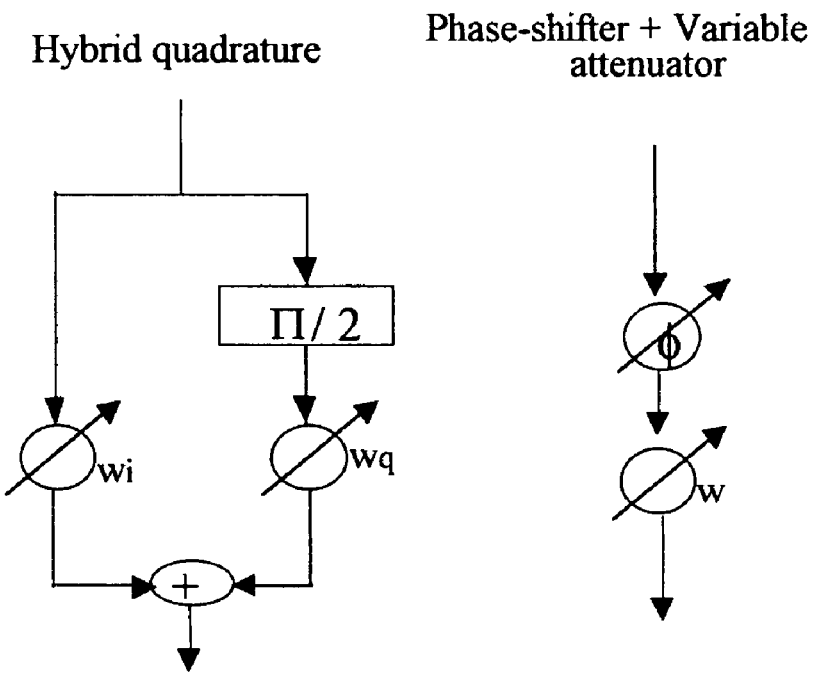
FIG. 3 is a purely spatial adaptive filter for an analog implementation.
Figure 4:
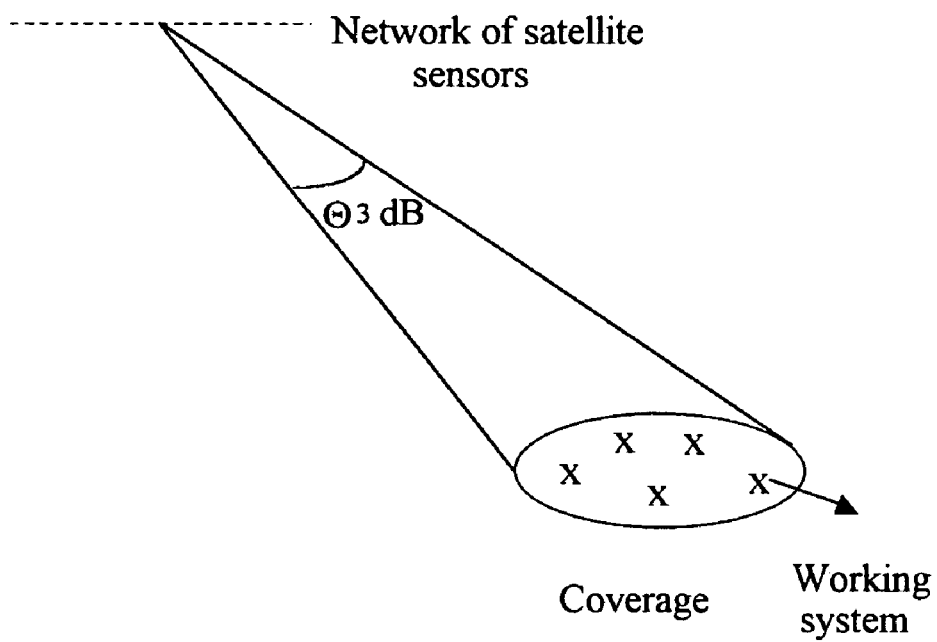
FIG. 4 shows the coverage demarcated by the beam associated with the set of weightings when there are no jamming units.

It is assumed that each of the N sensors Ci of the network or array of the FIG. 2 receives the contribution from U useful sources, coming from the theatre of operations, from P jamming units disturbing the communications and from a background noise. It is assumed that all the signals are narrowband signals for the network or array of sensors.

A1. Expression for a Digital Implementation of the Adaptive Antenna

Figure 5:
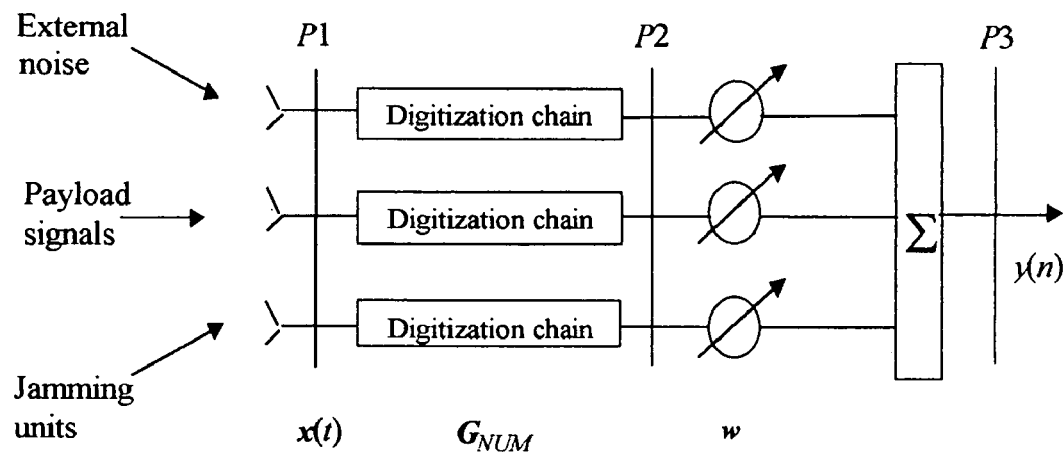
FIG. 5 shows a structure of the adaptive antenna for a digital implementation of the filters.

FIG. 5 shows the structure of the adaptive antenna in the case of a digital implementation of the adaptive filters.

The N sensors of the network correspond either to REs, or to sub-networks or sub-arrays preformed in analog mode. In the context of a digital implementation, the vector, x(t), of the envelopes of the signals brought to the point P1 of the FIG. 5 is written as follows at the instant t $$x(t) = \sum_{u=1}^{U} s_u(t) S_u + \sum_{p=1}^{P} j_p(t) J_p + b_a(t) + b_T(t) \qquad (1)$$

where $b_a(t)$ is the noise vector at the point P1 coming from the network or array of sensors or antennas (external noise+thermal noise of the RF reception chains), $b_T(t)$ is the thermal noise vector of the digital chains brought to P1, $j_p(t)$ and $J_p$ correspond respectively to the complex envelope and to the direction vector of the jamming unit p, $s_u(t)$ and $S_u$ respectively correspond to the complex envelope and to the direction vector of the station u.

In the general case pertaining to any unspecified sensors, the component n of the direction vector $S_u$ is given by $$S_{un} = f_n(k_u, \eta_u)\exp(-jk_u r_n) \qquad (2)$$

where $k_u$ and $\eta_u$ are respectively the wave vector and the polarization parameters of the station u, $r_n$ is the position vector of the sensor n and $f_n(k_u, \eta_u)$ is the complex response of the sensor n in the direction $k_u$ for the polarization $\eta_u$.

On the above assumptions, the complex envelope at the instant $nT_e$, y(n), of the sampled output of the jamming-protected communications BFN associated with the set of weighting operations w, is written as follows:

$$y(n) \triangleq w^\dagger G_{num} x(n) = \sum_{u=1}^{U} s_u(n) w^\dagger G_{num} S_u + \qquad (3)$$

$$\sum_{p=1}^{P} j_p(n) w^\dagger G_{num} J_p + w^\dagger G_{num} b_a(n) + w^\dagger G_{num} b_T(n)$$

where $T_e$ is the sampling period, $G_{num}$ is the diagonal matrix (N×N) whose diagonal elements are the gains of the digitization chains.

Figure 6:
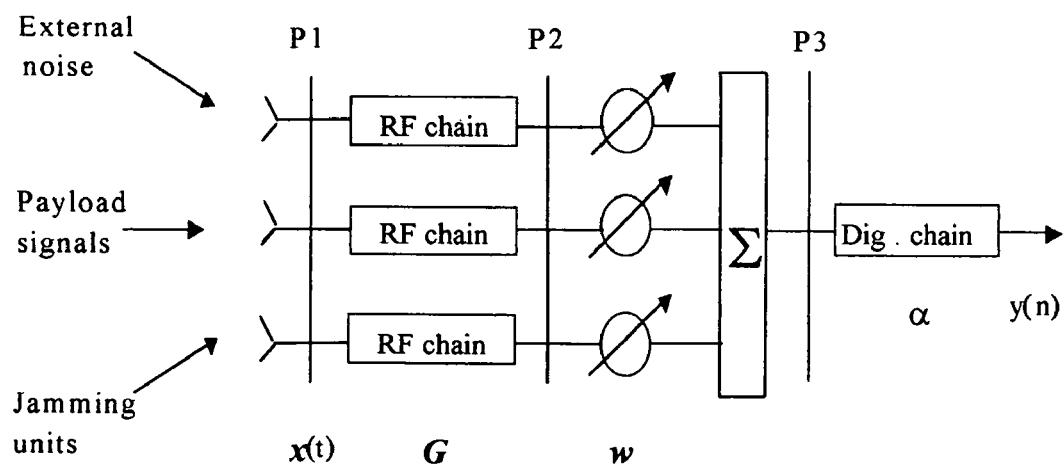
FIG. 6 shows a structure of the adaptive antenna for an analog implementation of the filters.

A2. Expression for an Analog or Hybrid Implementation of the Adaptive Antenna FIG. 6 shows the structure of the adaptive antenna in the case of an analog or hybrid implementation of the adaptive antenna, namely for an analog application of the adapter filters.

The N sensors Ci of the corresponding networks are either REs or sub-networks preformed in analog mode. In the context of an analog implementation, the vector, x(t), of the envelopes of the signals brought to the point P1 of the FIG. 6 is written as follows at the instant t $$x(t) = \sum_{u=1}^{U} s_u(t) S_u + \sum_{p=1}^{P} j_p(t) J_p + b_a(t) \qquad (4)$$

where $b_a(t)$ is the noise vector at the point P1 coming from the network of active sensors (external noise+thermal noise of the RF reception chains) and/or the other parameters defined in the above paragraph.

On the above assumptions, the complex envelope, y(n), of the sampled output of the jamming-protected communications BFN associated with the set of weightings w, is written as follows:

$$y(n) \stackrel{\Delta}{=} \alpha\{w^\dagger G x(n) + b_T(n)\} = \qquad (5)$$
$$\alpha\left\{\sum_{u=1}^{U} s_u(n) w^\dagger G S_u + \sum_{p=1}^{P} j_p(n) w^\dagger G J_p + w^\dagger G b_a(n) + b_T(n)\right\}$$

where G is the diagonal matrix (N×N) whose diagonal elements are the gains of the RV chains, w is the vector of the analog weightings, $\alpha$ the gain of the digitization chain of the output of the BFN and $b_T(n)$ is the thermal noise of the digitization chain of the output brought to the point P3.

In practice, the matrix G is generally known for a reference temperature $T_0$ and is denoted $G_0$. For an antenna temperature, $T_{Ant}$, the matrix G is no longer equal to $G_0$ but takes the value $$G = [G_0^2 + (T_{Ant} - T_0) \delta G^2 I]^{1/2} \qquad (6)$$

where $\delta G$ is a coefficient of variation of the gain in amplitude of the RF chains with the temperature and I is the identity matrix.

B. Power of the Output of a Jamming-Protected Communications BFN

B1. Expression for a Digital Implementation of the Adaptive Antenna

Assuming that all the signals are decorrelated from one another, from the equation (3), we deduce the power of the output of the communications BFN in the case of a digital application of the adapter filters, given by $$\pi_y \stackrel{\Delta}{=} <E[|y(n)|^2]> = w^\dagger G_{num} R_x G_{num}^\dagger w = \qquad (7)$$
$$\sum_{u=1}^{U} \pi_u |w^\dagger G_{num} S_u|^2 + \sum_{p=1}^{P} \pi_p |w^\dagger G_{num} J_p|^2 + (\eta_a + \eta_T) w^\dagger G_{num} G_{num}^\dagger w$$

where <.> corresponds to the operation of temporal averaging on an infinite horizon of observation, $R_x \stackrel{\Delta}{=} <E[x(n)$ $x(n)^\dagger]>$ is the averaged matrix of correlation of x(n), $\pi_u \stackrel{\Delta}{=} <E[|s_u(n)|^2]>$ is the mean power of the station u picked up by an omnidirectional RE, $\pi_p \stackrel{\Delta}{=} <E[|j_p(n)|^2]>$ is the mean power of the jamming unit p picked up by an omnidirectional RE, $\eta_a$ and $\eta_T$, such that $<E[b_a(n) b_a(n)^\dagger]> = \eta_a I$ and $<E[b_T(n) b_T(n)^\dagger]> = \eta_T I$, are the equivalent mean power values per sensor brought to the point P1 in terms of antenna noise and thermal noise respectively, assumed to be spatially white.

In introducing the power values $P_u$, $P_p$, $P_a$, $P_T$, respectively of the station u, the jamming unit p, the noise of the antenna a and the thermal noise of the digitization chains at output of the communications BFN, respectively defined by:

$$P_u = \pi_u |w^\dagger G_{num} S_u|^2 \qquad (8)$$

$$P_p = \pi_p |w^\dagger G_{num} J_p|^2 \qquad (9)$$

$$P_a = \eta_a w^\dagger G_{num} G_{num}^\dagger w \qquad (10)$$

$$P_T = \eta_T w^\dagger G_{num} G_{num}^\dagger w \qquad (11)$$

the expression takes the following form:

$$\pi_y = \sum_{u=1}^{U} P_u + \sum_{p=1}^{P} P_p + P_a + P_T \qquad (12)$$

The power values $\eta_a$ and $\eta_T$ are given by $$\eta_a = kT_a B \qquad (13)$$

$$\eta_T = kT_T B \qquad (14)$$

where k is the Boltzman's constant, B is the reception band and $T_a$ and $T_T$ are the temperatures of the equivalent antenna noise and thermal noise per sensor at P1. The equivalent thermal noise temperature at P1 per sensor, $T_T$, is computed from the ambient temperature, $T_{amb}$, and from the noise factors of the elements of the digitization chain for the sensor considered. In practice, the equivalent antenna noise temperature at P1 is generally known for a reference temperature $T_0$ and is denoted $T_{a0}$. For an antenna temperature, $T_{Ant}$, the noise temperature $T_a$ is no longer equal to $T_{a0}$ but takes the value $$T_a = T_{a0} + (T_{Ant} - T_0) \delta T \qquad (15)$$

where $\delta T$ is a noise temperature gradient relative to the temperature of the antenna, known a priori.

Furthermore, the power $\pi_u$ of the station u is linked to its ERIP, ERIP(u), by the following expression $$\pi_u = ERIP(u)(\lambda/4\pi r_u)^2 \qquad (16)$$

where $\lambda$ is the wavelength of the carrier wave, and $r_u$ is the distance between the station u and the satellite. A similar relation links the power $\pi_p$ of the jamming unit p and its ERIP, ERIP(p).

B2. Expression for an Analog Implementation of the Adaptive Filters

Again assuming signals that are decorrelated from each other, from the expression (5), we deduce the power of the output of the communications BFN in the case of an analog application of the adaptive filters expressing $$\pi_y \stackrel{\Delta}{=} <E[|y(n)|^2]> = |\alpha|^2 \{w^\dagger G R_x G^\dagger w + \eta_T\} = \qquad (17)$$
$$|\alpha|^2 \left\{\sum_{u=1}^{U} \pi_u |w^\dagger G S_u|^2 + \sum_{p=1}^{P} \pi_p |w^\dagger G J_p|^2 + \eta_a w^\dagger G G^\dagger w + \eta_T\right\}$$

where $\eta_a$, such that $<E[b_a(n) \; b_a(n)^\dagger]>=\eta_a \; I$, is the mean power, at the point P1, of noise per sensor coming from the active network (external noise+thermal noise of the reception chains), $\eta_T \stackrel{\Delta}{=} <E[|b_T(n)|^2]>$ is the mean power of thermal noise coming from the digitization chain brought to P3. The quantities $\eta_a$ and $\eta_T$ are defined respectively by (13) and (14) where $T_a$ is the equivalent thermal noise temperature per sensor of the active antenna at P1 and where $T_T$ is the equivalent thermal noise temperature coming from the digitization chain and brought to P3. Similarly, the power values $\pi_u$ and $\pi_p$ are related to the ERIP by the expression (16).

In introducing the power values $P'_u$, $P'_p$, $P'_a$, $P'_T$, respectively of the station u, the jamming unit p, the noise of the antenna and the thermal noise of the digitization chain at output of the communications BFN defined respectively by:

$$P'_u = |\alpha|^2 \pi_u |w^\dagger G S_u|^2 \quad (18)$$

$$P'_p = |\alpha|^2 \pi_p |w^\dagger G J_p|^2 \quad (19)$$

$$P'_a = |\alpha|^2 \eta_a w^\dagger G G^\dagger w \quad (20)$$

$$P'_T = |\alpha|^2 \eta_T \quad (21)$$

the expression (17) takes the form (12).

Principle of the Invention

The steps of the method according to the invention rely especially on the following idea: from an estimation of the mean power, $\pi_y$, the output of the communications BFN and the estimates of the quantities $P_u$, $P_a$ et $P_T$, $P'_u$, $P'_a$ and $P'_T$, the method makes it possible to estimate the efficiency of the anti-jamming. This is done especially by estimating different residual jamming unit/stations ratios, in the reception band, at output of the communications BFN.

For example, according to an exemplary implementation, the method uses three residual jamming unit/station ratios whose values make it possible to evaluate the efficiency of the anti-jamming or of the set of weightings w considered at output of the communications BFN. The three ratios considered here below in the document correspond to:

the ratio of the power values respectively of the sum of the residual jamming units to the sum of the stations in the reception band B, hereinafter called (J/S per channel) and referenced $J_{tot}/S_{tot}$ the ratio of the power values respectively of the sum of the residual jamming units to the power of the station u in the reception band B, hereinafter called ($J/S_u$ per channel) and referenced $J_{tot}/S_u$ the ratio of the power values respectively of the sum of the residual jamming units to the power of a station, in the band $B_u$ of the station, hereinafter called ($J/S_u$ per station or per link) and referenced, for the station u, $J/S_u$.

These quantities are defined respectively by:

$$J_{tot}/S_{tot} = \left(\sum_{p=1}^{P} P_p\right) / \left(\sum_{u=1}^{U} P_u\right) \quad (22)$$

$$J_{tot}/S_u = \left(\sum_{p=1}^{P} P_p\right) / P_u \quad (23)$$

$$J_u/S_u = \left(\sum_{p=1}^{P} P_{pu}\right) / P_u \quad (24)$$

where $P_{pu}$ is the power of the jamming unit p in the band $B_u$.

The quantity $P_u$, $P'_u$ respectively defined by (8) or (18), is estimated from a priori knowledge of the theater of operations (ERIP and position of the working stations), the center frequency of the reception band, the responses of the sensors of the network, the set of weightings w well as the gains of the reception and digitization chains, $G_{num}$, G, $\alpha$, known on an a priori basis or computed by (6) from the temperature of the antenna and of the parameter $\delta G$.

The quantity $P_a$, $P'_a$ respectively defined by (10) or (20) is estimated from a priori knowledge of the set of weightings w, the gains of the reception and/or digitization chains, $G_{num}$, G, $\alpha$, known on an a priori basis or computed by (6) from the temperature of the antenna and the parameter $\delta G$ ($\delta G$ is a coefficient of variation of the gain in amplitude of the RF chains with the temperature) as well as from the equivalent noise temperature of the antenna, $T_a$, in P1 (itself a function of the temperature of the antenna, $T_{ant}$), the reference temperature $T_0$, the temperature of the antenna noise, $T_{a0}$ at P1 at the temperature $T_0$ and the variation in noise temperature, $\delta T$, with the temperature.

Finally, the quantity $P_T$, $P'_T$ defined by (11) or (21), is estimated, for a digital implantation, from a priori knowledge of the set of weightings w, gains of the digitization chains, $G_{num}$, as well as the temperature $T_r$ of the equivalent thermal noise per sensor in P1. For an analog implantation of the filters, the quantity $P_T$ is estimated from the knowledge of the gain, $\alpha$, the digitization chain at output of the BFN and the thermal noise temperature of this chain brought to P3, $T_r$. In both cases, the quantity $T_r$ is estimated from the ambient temperature $T_{amb}$ and from the noise factors of the elements constituting the digitization chain or chains.

C. Estimation of the J/S at Output of the Communications BFN

For a digital implantation of the filters, the estimation of the ratios defined by the expressions (22) to (24) necessitates the estimation of the quantities $\pi_y$, $P_u$, $P_a$ and $P_T$ defined respectively by (7), (8), (10) and (11) and, for an analog implantation of the filters, it necessitates the estimation of the quantities $P'_u$, $P'_a$ and $P'$, defined respectively by (17), (18), (20) and (21).

C1. Estimation of $\pi_y$

The method estimates the mean power $\pi_y$ of the output of the communications BFN from a number K of samples, y(k), $1 \leq k \leq K$, of this output. For a sufficient oversampling factor, an asymptotically unbiased estimator of this mean power is given by:

$$\hat{\pi}_y \stackrel{\Delta}{=} \frac{1}{K} \sum_{k=1}^{K} ;; |y(k)|^2 \quad (25)$$

This estimator becomes consistent for stationary and ergodic outputs and cyclostationary and cycloergodic outputs.

C2. Estimation of $P_u$

The method estimates the values $\hat{P}_u$, $\hat{P}'_u$ of the power $P_u$, $P'_u$ defined by (8) or (18) in using firstly the a priori knowledge of the parameters w and $G_{num}$ for a digital application of the adaptive filters and $|\alpha|^2$, w and G for an analog application of these filters and, secondly, the estimation of the parameters $\pi_u$ and $S_u$.

The applied set of weightings w is permanently known while the matrix gain $G_{num}$ and scalar gain $|\alpha|^2$ of the digitization chains are parameters adjustable from the ground by the operator so as to optimize the use of the dynamic range of the ADC or ADCs as a function of the jamming environment. The matrix G of the gains in amplitude of the analog reception chains is mastered, through the expression (6), from the knowledge of the matrix $G_0$ of the gains for the reference temperature $T_0$, the parameter $\delta G$ and the permanent control of the temperature of the antenna $T_{Ant}$.

The mean power, $\pi_u$, of the station u, received by an omnidirectional sensor is estimated by the expression (16) where the ERIP, ERIP(u), of the station u is known a priori and listed in a mission plan, where $\lambda$ is deduced from the frequency channel and where $r_u$ is deduced, for a geostationary satellite, from the position of the station u on the earth.

Finally, the direction vector $S_u$, whose component n is given by (2), can be deduced from a priori knowledge of the positions, $r_n$ of the sensors of the network, of the wave vector $k_u$ through the position of the station u, the polarization, $\eta_u$ of the station u and the complex responses $f_n(k_u, \eta_u)$ of the sensors for the wave vector $k_u$ and the polarization $\eta_u$.

C3. Estimation of $P_a$

The method estimates the values $\hat{P}_a$, $\hat{P}'_a$ of the power values $P_a$, $P'_a$ defined by (10) or (20), in using firstly the a priori knowledge of the parameters w and $G_{num}$ for a digital application of the adaptive filters and $|\alpha|^2$, w and G for an analog application of these filters and, secondly, the estimation of the parameter $\eta_a$.

The mastery of the parameters w, $G_{num}$, G and $|\alpha|^2$ is discussed in the previous paragraph. The estimation of the power, $\eta_a$, of the noise of the antenna per sensor at the point P1 is computed by the expression (13) where the equivalent noise temperature of the antenna, $T_a$, at P1 is obtained by the expression (15) from the a priori knowledge of the reference temperature $T_0$, the antenna noise temperature, $T_{a0}$, at P1 at the temperature $T_0$, the variation of the noise temperature, $\delta T$ with the temperature and the permanent measurement of the temperature of the antenna $T_{Ant}$.

C4. Estimation of $P_T$

The method estimates the values $\hat{P}_T$, $\hat{P}'_T$ of the power $P_T$, $P'_T$ defined by (11) or (21), and requires, firstly, a priori knowledge of the parameters w and $G_{num}$ for a digital application of the adaptive filters and $|\alpha|^2$ for an analog application of these filters and, secondly, the estimation of the parameter $\eta_T$.

The control of the parameters w, $G_{num}$ and $|\alpha|^2$ is given in the paragraph B. The power, $\eta_T$, is estimated from the expression (14) where $T_T$ is the temperature of the equivalent thermal noise of a sensor digitization chain brought to P1, for an application of the adaptive filters in digital mode, and of the digitization chain of the output of the BFN brought to P3, for an application of the filters in analog mode. In both cases, the quantity $T_r$ is estimated from the ambient temperature $T_{amb}$ and from the noise factors of the elements constituting the digitization chain or chains.

With the different values $\pi_y$, $P_u$, $P_a$ and $P_T$ having been estimated, according to the method, at least one of the three ratios $\hat{J}_{tot}/\hat{S}_{tot}$, $\hat{J}_{tot}/\hat{S}_u$, $\hat{J}/\hat{S}_u$ is estimated. The expressions have been given for the case of a digital application of the adaptive filters and remain valid in exchanging the letters, $P_u$, $P_a$ and $P_T$, by the letters $P'_u$, $P'_a$ and $P'_T$, for an analog application of the adaptive filters.

C5. Estimation of $J_{tot}/S_{tot}$

From the above estimations, we deduce an estimation, $\hat{J}_{tot}/\hat{S}_{tot}$, of the ratio $J_{tot}/S_{tot}$ defined by (22), given by $$\hat{J}_{tot}/\hat{S}_{tot} = \left(\hat{\pi}_y - \sum_{u=1}^{U} ; ; \hat{P}_u - \hat{P}_a - \hat{P}_T\right) \bigg/ \left(\sum_{u=1}^{U} ; ; \hat{P}_u\right) \quad (26)$$

C6. Estimation of $J_{tot}/S_u$

From the above estimations, the method deduces an estimation, $\hat{J}_{tot}/\hat{S}_u$, of the ratio $J_{tot}/S_u$ defined by (23), given by $$\hat{J}_{tot}/\hat{S}_u = \left(\hat{\pi}_y - \sum_{u=1}^{U} ; ; \hat{P}_u - \hat{P}_a - \hat{P}_T\right) \bigg/ \hat{P}_u \quad (27)$$

C7. Estimation of $J/S_u$

The estimation, $\hat{J}/\hat{S}_u$, of the ratio $J/S_u$ defined by the expression (24), necessitates the estimation of the total power of residual jamming units in the band $B_u$ of the working station u. This estimation necessitates the following operations:

reception of the samples, y(k), of the output y(t) of the communications BFN, bandpass filtering of the samples around the band $B_u$. The samples $y_u(k)$ are obtained, estimation of the power of the output filtered by (25) where $y_u(k)$ replaces y(k). We obtain $\hat{\pi}_{yu}$ estimation of the power values of antenna noise and thermal noise respectively at output of the BFN in the band $B_u$. These quantities are computed, from the equivalent noise temperatures computed here above, by the expressions (13) and (14) respectively, where B is replaced by $B_u$. We thus obtain $\hat{P}_{au}$ and $\hat{P}_{Tu}$, Computation of the power of the stations v other than the station u in the band $B_u$ at output of the communications BFN. The approach is that of the step B but one in which, for each station v different from u, the ERIP used in the computation of $\hat{\pi}_v$ is that of the station v in the band $B_u$. Thus the quantities $\hat{P}_{vu}$ are obtained, computation of the ratio $\hat{J}/\hat{S}_u$, by the expression:

$$\hat{J}/\hat{S}_u = \left(\hat{\pi}_{yu} - \hat{P}_u - \sum_{v \neq u} ; ; \hat{P}_{vu} - \hat{P}_{au} - \hat{P}_{Tu}\right) \bigg/ \hat{P}_u \quad (28)$$

With the estimate of at least one of the three ratios being known, the method compares the estimated value or values with a threshold value Vs.

If the value found is above this threshold value then, according to the invention, a message is sent on the inefficiency of the anti-jamming. If not, the message informs, for example, an operator that the jamming efficiency is sufficient.

The threshold values take account firstly of the permissible jamming power per station or per channel to carry out the demodulation of the stations and, secondly, the precision of estimation of the previous ratios. The computations of precision made in the paragraphs Di show that, for jamming unit/station ratios at output greater than 0 dB, the precision of estimation of these ratios by the proposed method is very high whereas this precision decreases with the ratios between the jamming units and the output signal. In this context, it may be considered that the anti-jamming is not efficient if the ratios between the jamming units and the output station exceed 0 dB.

Thus, the control of the precision with which the estimators given here above estimate the different Jamming unit/Station rations considered enables especially an efficient operational exploitation of these estimators. For this reason, the method may comprises a step for determining the precision of each of these three estimators.

D1. Precision of Estimation of $\pi_y$

The estimate $\hat{\pi}_y$ is related to $\pi_y$ by the following expression:

$$\hat{\pi}_y =;^{\Delta}\pi_y(1+\alpha\pi_y) \quad (29)$$

where $\Delta\pi_y$ characterizes the error on the estimation of $\Delta\pi_y$. the previous expression expressed in dB becomes $$(\hat{\pi}_y)_{dB}=(\pi_y)_{dB}+10 \log_{10}(1+\Delta\pi_y)=;^{\Delta}(\pi_y)_{dB}+\Delta(\pi_y)_{dB} \quad (30)$$

Assuming that the samples y(k) are independent (all the sources are spread out in the reception band B), stationary, Gaussian, the estimator (25) is not biased ($E[\hat{\pi}_y]=\pi_y$) and has a variance:

$$\text{Var}[\hat{\pi}_y]=\pi_y^2/K \quad (31)$$

i.e. a mean standard deviation of $$\sigma[\hat{\pi}_y]=\pi_y/\sqrt{K} \quad (32)$$

Thus, in 99% of cases, the estimator $\hat{\pi}_y$ is such that $$\pi_y(1-3/\sqrt{K})\leq\hat{\pi}_y\leq\pi_y(1+3/\sqrt{K}) \quad (33)$$

where $\Delta\pi_y$ is a centered random variable, that is quasi-Gaussian for K as a great value and having a mean standard deviation $1/\sqrt{K}$. Thus, in 99% of the cases, $$-3/\sqrt{K}\leq\Delta\pi_y\leq 3/\sqrt{K} \quad (34)$$

$$10 \log_{10}(1-3/\sqrt{K})\leq\Delta(\pi_y)_{dB}\leq 10 \log_{10}(1+3/\sqrt{K}) \quad (35)$$

Digital Application:

For K = 1000, we obtain $-0.4\,dB \leq \Delta(\pi_y)_{dB} \leq 0.4\,dB$ i.e. precision of $\pm 0.4$ dB.

D2. Precision of Estimation of $P_u$

From the expressions (8), (16) and (18), we deduce the expression of the power $P_u$ at output of the communications BFN for an application of the digital and analog filters respectively, given respectively by $$P_u=ERIP(u)(\lambda/4\pi r_u)^2|w^\dagger G_{num}S_u|^2 \quad (36)$$

$$P'_u=ERIP(u)(\lambda/4\pi r_u)^2|\alpha|^2|w^\dagger GS_u|^2 \quad (37)$$

This means that the power of the station u, $\hat{P}_u$ reconstructed from the information on the mission, can be written as follows for a digital and analog application, respectively, of the filters $$\hat{P}_u=;^{\Delta}P_u(1+\Delta P_u)=P_u(1+\Delta ERIP(u))(1+\Delta|w^\dagger G_{num}S_u|^2) \quad (38)$$

$$\hat{P}'_u=;^{\Delta}P'_u(1+\Delta P'_u)=P'_u(1+\Delta ERIP(u))(1+\Delta|\alpha|^2)(1+\Delta|w^\dagger GS_u|^2) \quad (39)$$

where the quantities $\Delta ERIP(u)$, $\Delta|\alpha|^2$, $\Delta|w^\dagger G_{num}S_u|^2$ et $\Delta|w^\dagger GS_u|^2$ are the errors in the knowledge, respectively, of $ERIP(u)$, $|\alpha|^2$, $|w^\dagger G_{num}S_u|^2$ et $|w^\dagger GS_u|^2$.

From the previous expressions, we deduce that of $\hat{P}_u$ in dB, given by $$(\hat{P}_u)_{dB}=(P_u)_{dB}+10 \log_{10}(1+\Delta P_u)=;^{\Delta}(P_u)_{dB}+\Delta(P_u)_{dB} \quad (40)$$

where, for an application of the filters in digital mode $$\Delta(P_u)_{dB}=\Delta(ERIP(u))_{dB}+\Delta(|w^\dagger G_{num}S_u|^2)_{dB} \quad (41)$$

whereas, for an application of the filters in analog mode $$\Delta(P'_u)_{dB}=\Delta(ERIP(u))_{dB}+\Delta(|\alpha|^2)_{dB}+\Delta(|w^\dagger GS_u|^2)_{dB} \quad (42)$$

Digital Application:

For example, if it is assumed that the uncertainty on the ERIP of the stations, $\Delta(ERIP(u))_{dB}$, is $\pm 2$ dB, the uncertainty on the gain of the digitization chain of the output of the BFN, $\Delta(|\alpha|^2)_{dB}$, is $\pm 0.5$ dB (because of the drifts in temperature and the effective application of the gain), the uncertainty, $\Delta(|w^\dagger G_{num}S_u|^2)_{dB}$, is $\pm 1$ dB because of $\pm 0.5$ dB of uncerta on the gains of the digitization chains and $\pm 0.5$ dB of uncertainty on the components of the direction vector $S_u$ because of the uncertainties on the position of the station and on the responses of the sensors, the uncertainty, $\Delta(|w^\dagger GS_u|^2)_{dB}$, is $\pm 1$ dB for the same reasons as above.

The value $\Delta(P_u)_{dB}=\pm 3$ dB is obtained for a digital application of the filters and $\Delta(P_u)_{dB}=\pm 3.5$ dB for an analog application of the filters.

D3. Precision of Estimation of $P_a$

From the expressions (10), (13) and (20), we deduce the expression of the power $P_a$ at output of the communications BFN for an application of the digital and analog filters respectively, given respectively by:

$$P_a=kT_a Bw^\dagger G_{num}G_{num}^\dagger w \quad (43)$$

$$P'_a=kT_a B|\alpha|^2 w^\dagger GG^\dagger w \quad (44)$$

This means that the antenna noise power, $\hat{P}_a$, reconstructed from the information on the reception chains, the set of complex weightings and the antenna noise temperature can be written as follows for a digital application and an analog application, respectively, of the filters:

$$\hat{P}_a=;^{\Delta}P_a(1+\Delta P_a)=P_a(1+\Delta T_a)(1+\Delta(w^\dagger G_{num}G_{num}^\dagger w)) \quad (45)$$

$$\hat{P}'_a=;^{\Delta}P'_a(1+\Delta P'_a)=P'_a(1+\Delta T_a)(1+\Delta|\alpha|^2)(1+\Delta(w^\dagger GG^\dagger w)) \quad (46)$$

where the quantities $\Delta T_a$, $\Delta|\alpha|^2$, $\Delta(w^\dagger G_{num}G_{num}^\dagger w)$ et $\Delta(w^\dagger GG^\dagger w)$ are the errors pertaining to the knowledge, respectively, of $T_a$, $|\alpha|^2$, $w^\dagger G_{num}G_{num}^\dagger w$ and $w^{\dagger'}GG^\dagger w'$.

From the above expressions, we deduce that of $\hat{P}_a$ in dB, given by $$(\hat{P}_a)_{dB}=(P_a)_{dB}+10 \log_{10}(1+\Delta P_a)=;^{\Delta}(P_a)_{dB}+\Delta(P_a)_{dB} \quad (47)$$

where, for an application of the filters in digital mode $$\Delta(P_a)_{dB}=\Delta(T_a)_{dB}+\Delta(w^\dagger G_{num}G_{num}^\dagger w)_{dB} \quad (48)$$

whereas for an application of the filters in analog mode $$\Delta(P'_a)_{dB}=\Delta(T_a)_{dB}+\Delta(w^\dagger GG^\dagger w)_{dB}+\Delta(|\alpha|^2)_{dB} \quad (49)$$

Digital Application:

For example, if it is assumed that:

the uncertainty on the antenna temperature is ±0.5 dB, the uncertainty on the gain of the digitization chain of the output of the BFN, $\Delta(|\alpha|^2)_{dB}$, is ±0.5 dB (because of the drifts in temperature and the effective application of the gain), the uncertainties, $\Delta(w^\dagger G_{num} G_{num}^\dagger w)_{dB}$ and $\Delta(w^\dagger GG^\dagger w)_{dB}$ are ±0.5dB because of ±0.5 dB of uncertainty on the gains of the RF and digitization chains.

$\Delta(P_a)_{dB} = \pm 1$ dB is obtained for a digital application of the filters and $\Delta(P_u)_{dB} = \pm 1.5$ dB for an analog application of the filters.

D4. Precision of Estimation of $P_T$

From the expressions (11), (14) and (21), we deduce the expressions of the power $P_T$ at output of the communications BFN for an application of the digital and analog filters respectively, given respectively by $$P_T = kT_T B w^\dagger G_{num} G_{num}^\dagger w \quad (50)$$

$$P'_T = kT_T B |\alpha|^2 \quad (51)$$

where $T_T$ has a different sense depending on the nature of the implementation. This means that the antenna noise power, $P'_T$, reconstructed from the information on the reception chains, the set of complex weightings and the thermal noise temperature at P1 for a digital implantation and at P3 for an analog implantation is written as follows for a digital application and an analog application, respectively, of the filters:

$$P^\wedge_T ;^\Delta P_T(1+\Delta P_T) = P_T(1+\Delta T_T)(1+\Delta(w^\dagger G_{num} G_{num}^\dagger w)) \quad (52)$$

$$P'^\wedge_T ;^\Delta P'_T(1+\Delta P'_T) = P'_T(1+\Delta T_T)(1+\Delta|\alpha|^2) \quad (53)$$

where the quantities $\Delta T_T$, $\Delta|\alpha|^2$ and $\Delta(w^\dagger G_{num} G_{num}^\dagger w)$ are the errors relating knowledge of $T_T$, $|\alpha|^2$ and $w^\dagger G_{num} G_{num}^\dagger w$ respectively.

From the above expressions, we deduce that of $P^\wedge_T$ in dB, given by $$(P^\wedge_T)_{dB} = (P_T)_{dB} + 10 \log_{10}(1+\Delta P_T) \triangleq (P_T)_{dB} + \Delta(P_T)_{dB} \quad (54)$$

where, for an application of the filters in digital mode $$\Delta(P_T)_{dB} = \Delta(T_T)_{dB} + \Delta(w^\dagger G_{num} G_{num}^\dagger w)_{dB} \quad (55)$$

whereas, for an application of the filters in analog mode $$\Delta(P'_T)_{dB} = \Delta(T_T)_{dB} + \Delta(|\alpha|^2)_{dB} \quad (56)$$

Digital Application:

For example, if it is assumed that:

the uncertainty on the antenna temperature is ±0.5 dB, the uncertainty on the gain of the digitization chain of the output of the BFN, $\Delta(|\alpha|^2)_{dB}$, is ±0.5 dB (because of the drifts in temperature and the effective application of the gain), the uncertainties, $\Delta(w^\dagger G_{num} G_{num}^\dagger w)_{dB}$ are ±0.5 dB because of ±0.5 dB of uncertainty on the gains of the RF and digitization chains.

$\Delta(P_a)_{dB} = \pm 1$ dB is obtained for a digital as well as an analog application of the filters.

E. Precision of Estimation of $S_{tot}$

The estimation, $S^\wedge_{tot}$, de $S_{tot}$ is written as follows:

$$S^\wedge_{tot} \triangleq; S_{tot}(1+\Delta S_{tot}) = \sum_{u=1}^{U} ; ; P^\wedge_u = \sum_{u=1}^{U} ; ; P_u(1+\Delta P_u) \text{ giving in dB} \quad (57)$$

$$\left(S^\wedge_{tot}\right)_{dB} = (S_{tot})_{dB} + 10\log_{10}(1+\Delta S_{tot}) \triangleq (S_{tot})_{dB} + \Delta(S_{tot})_{dB} \text{ where} \quad (58)$$

$$\Delta(S_{tot})_{dB} = 10 \log_{10}\left(1+; \frac{\sum_u ; ; P_u \Delta P_u}{\sum_u ; ; P_u};\right) \quad (59)$$

Digital Application:

For example, if it is assumed that the precision on the power of the stations is identical for all the stations, $\Delta(S_{tot})_{dB} \approx \Delta(P_u)_{dB} \approx \pm 3$ dB or ±3.5 dB is obtained according to the nature of the implantation.

F. Precision of Estimation of $J_{tot}$

The estimation, $J^\wedge_{tot}$, of $J_{tot}$ is written as follows $$J^\wedge_{tot} \triangleq; J_{tot}(1+\Delta J_{tot}) = \pi^\wedge_y - \sum_{u=1}^{U} ; ; P^\wedge_u - P^\wedge_a - P^\wedge_T; \quad (60)$$

$$= \pi_y(1+\Delta \pi_y) - \sum_{u=1}^{U} ;; \quad (61)$$

$P_u(1+\Delta P_u) - P_a(1+\Delta P_a) - P_T(1+\Delta P_T)$ that is, in dB $$\left(J^\wedge_{tot}\right)_{dB} = (J_{tot})_{dB} + 10\log_{10}(1+\Delta J_{tot}) \triangleq (J_{tot})_{dB} + \Delta(J_{tot})_{dB} \text{ where} \quad (62)$$

$$\Delta(J_{tot})_{dB} = 10 \log_{10}(1+\text{Error!}) \quad (63)$$

From this result, it is deduced that the precision of estimation of $J_{tot}$ depends on the relative signal and jamming unit contributions at sampled output of the communications BFN.

More specifically, for jamming residues that are very high before the stations (either because of an absence of anti-jamming or because of low-performance anti-jamming, when there is high-level jamming at input) it is deduced from (63) that the precision on $J_{tot}$ is close to the precision on $\pi_y$.

Digital Application:

In these conditions, $\Delta(J_{tot})_{dB} \approx \Delta(\pi_y)_{dB} \approx \pm 0.4$ dB.

By contrast, for jamming residues that are very low before the stations (either because of an absence of jamming or because of high-performance anti-jamming) the total power is close to that of the working stations and the error may become very great.

G. Precision of Estimation of $J_{tot}/S_u$

The estimation, $Est[J_{tot}/S_u]$, of $J_{tot}/S_u$ is written as follows $$Est[J_{tot}/S_u] \triangleq; (J_{tot}/S_u)(1+\Delta(J_{tot}/S_u)) = J^\wedge_{tot} / S^\wedge_u \quad (64a)$$

$$= \text{Error!} \quad (64b)$$

whence $$(1+\Delta(J_{tot}/S_u)) = [1/(1+\Delta P_u)](1+\text{Error!}) \text{ that is, in dB} \quad (65)$$

$$\Delta(J_{tot}/S_u)_{dB} = 10 \log_{10}([1/(1+\Delta P_u)](1+\text{Error!})) \quad (66)$$

From this result, it is deduced that the precision of estimation of $J_{tot}/S_u$ depends on the relative signal and jamming unit contributions at sampled output of the communications BFN.

More specifically, for jamming residues that are very high before the stations (either because of an absence of anti-jamming or because of low-performance anti-jamming, when there is high-level jamming at input) it is deduced from (66) that the precision on $J_{tot}/S_u$ is given by:

$$\Delta(J_{tot}/S_u)_{dB} = 10 \log_{10}((1+\Delta\pi_y)/(1+\Delta P_u)) = \Delta(\pi_y)_{dB} - \Delta(P_u)_{dB} \quad (67)$$

Digital Application:

In these conditions, $\Delta(J_{tot}/S_u)_{dB} \approx \pm 3.4$ dB.

By contrast, for jamming residues that are very low before the stations (either because of an absence of jamming or because of high-performance anti-jamming) the total power is close to that of the working stations and the error may become very great.

H. Precision of Estimation of $J_{tot}/S_{tot}$

The estimation $Est[J_{tot}/S_{tot}]$, de $J_{tot}/S_{tot}$ can be written $$Est[J_{tot}/S_{tot}] \stackrel{\Delta}{=} (J_{tot}/S_{tot})(1 + \Delta(J_{tot}/S_{tot})) = \hat{J}_{tot} \Big/ \sum_{u=1}^{U} ;; \hat{P}_u \quad (67a)$$

$$= \text{Error! whence} \quad (67b)$$

$$(1 + \Delta(J_{tot}/S_{tot})) = \left[\sum^{U} ;; P_u \Big/ \sum^{U} ;; \quad (68)\right.$$

$$\left. P_u(1+\Delta P_u)\right] \times (1+\text{Error!}) \text{ that is, in dB}$$

$$\Delta(J_{tot}/S_{tot})_{dB} = \quad (69)$$

$$10 \log_{10}\left(\left[\sum^{U} ;; P_u \Big/ \sum^{U} ;; P_u(1+\Delta P_u)\right]\right) + 10 \log_{10}((1+\text{Error!}))$$

From this result, it is deduced that the precision of estimation of $J_{tot}/S_{tot}$ depends on the relative signal and jamming unit contributions at sampled output of the communications BFN.

More specifically, for jamming residues that are very high before the stations (either because of an absence of anti-jamming or because of low-performance anti-jamming, when there is high-level jamming at input) it is deduced from (69) that the precision on $J_{tot}/S_{tot}$ is given by $$\Delta(J_{tot}/S_{tot})_{dB} = 10 \log_{10}\left((1+\Delta\pi_y)\left[\sum^{U} ;; P_u \Big/ \sum^{U} ;; P_u(1+\Delta P_u)\right]\right) = \quad (70)$$

$$\Delta(\Delta\pi_y)_{dB} + 10 \log_{10}\left(\left[\sum^{U} ;; P_u \Big/ \sum^{U} ;; P_u(1+\Delta P_u)\right]\right)$$

which gives (67) if all the stations have the same precision.

Digital Application:

In these conditions, from the above examples, $\Delta(J_{tot}/S_{tot})_{dB} \approx 3.4$ dB.

By contrast, for jamming residues that are very low before the stations (either because of an absence of jamming or because of high-performance anti-jamming) the total power is close to that of the working stations and the error may become very great.

Exemplary Implementation of the Method in a Communications System

The method whose steps have been explained here above is, for example, used in the system comprising a base located on the ground and including a computer program to implement the functions described in detail here below, the base being linked by means known to those skilled in the art with one or more satellites equipped with chains such as those described in FIGS. 5 and 6.

Figure 7:
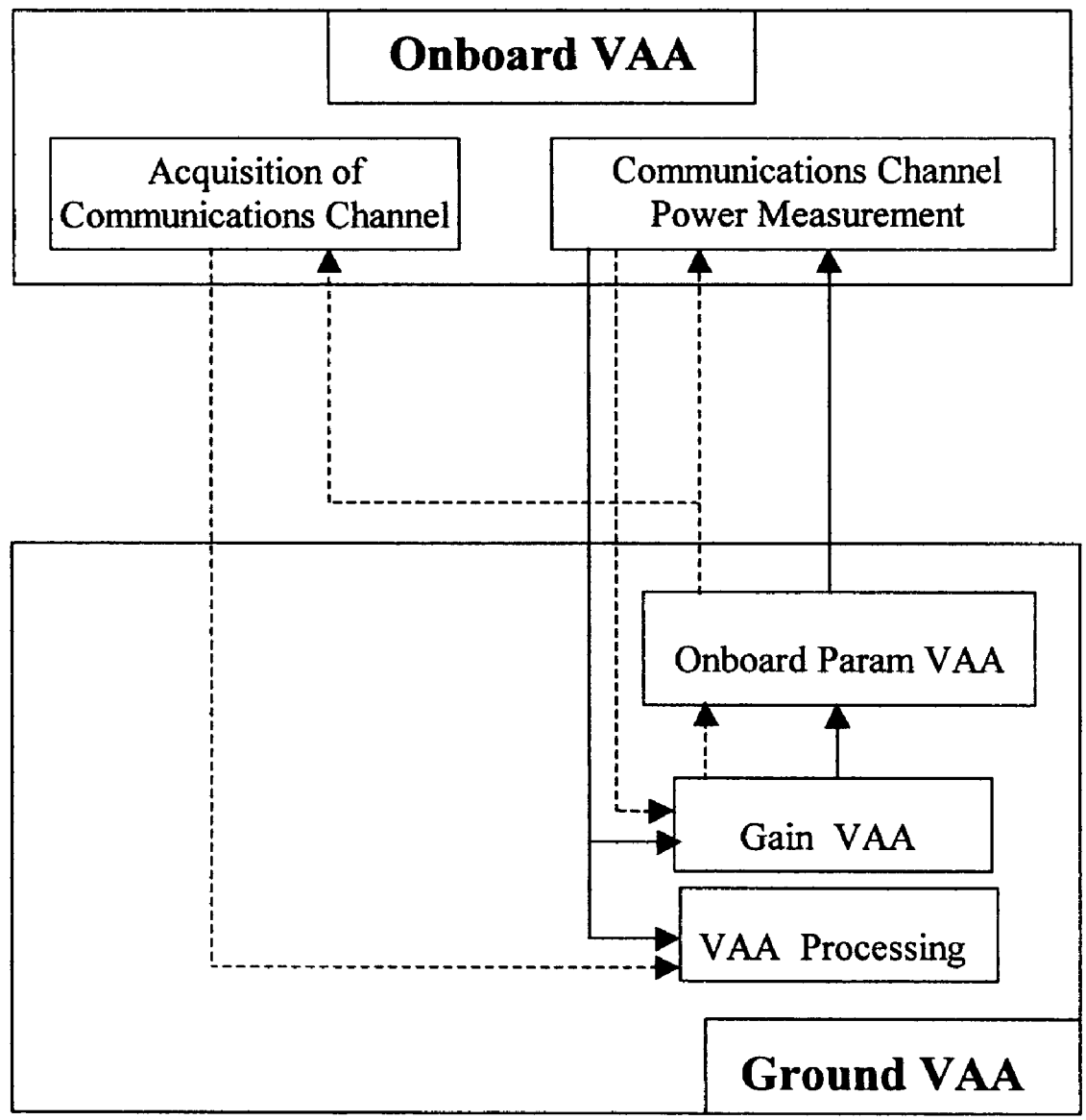
FIG. 7 is a functional diagram of the sequencing of the operations for the implementation of the system for verifying the efficiency of the anti-jamming.

FIG. 7 is a block diagram of an exemplary sequencing of operations. Two cases of operation sequencing are possible depending on whether it is sought to estimate the quantities $J_{tot}/S_{tot}$ and $J_{tot}/S_u$ relative to the reception band B or, on the contrary, the quantity $J_u/S_u$ relative to the band of the station u. In the former case, the term "verification by channel" will be used and in the latter case the term used will be "verification by station".

For a verification by channel, the method carries out the operations depicted by a solid line in FIG. 7. Starting from the ground and for a reception band B, it executes the following functions:

Communications Channel Power Measurement: whose aim is to estimate the total power available at output of the digitization chain of the communications BFN for the applied set of weighting operations and send it to the ground. This function is an onboard function parameterized from the ground by the function Onboard Param VAA implemented for example in a computer, VAA GAIN: whose aim is the optimizing, from the results of the Communications Channel Power Measurement function, of the gain of the digitization chain of the output of the communications BFN to be used by the onboard functions. This function is a ground function, Communications Channel Power Measurement: whose aim is to estimate and send to the ground the total power available at output of the digitization chain of the communications BFN for the applied set of weighting operations and for the gain optimized earlier, VAA processing: whose aim is to estimate the quantities $J_{tot}/S_{tot}$ and $J_{tot}/S_u$ relative to the reception band B. This function is a ground function.

For a verification by station, the method carries out the operations indicated by dashed lines in FIG. 7. From the ground and for a reception band B, it executes the following functions:

Communications Channel Power Measurement: whose aim is to estimate the total power available at output of the digitization chain of the communications BFN for the applied set of weighting operations and send it to the ground. This function is an onboard function parameterized from the ground by the function Onboard Param VAA function, VAA Gain: whose aim is the optimizing, from the results of the Communications Channel Power Measurement function, of the gain of the digitization chain of the output of the communications BFN to be used by the onboard functions. This function is a ground function, Communications Channel Acquisition: whose aim is the acquisition and sending to the ground of the samples available at output of the digitization chain of the communications BFN for the applied set of weighting operations and for the previously optimized gain. This function is an onboard function parameterized from the ground by the Onboard Param VAA function, VAA processing: whose aim is to estimate the quantities $J_u/S_u$ relatives to the stations insert. This function is a ground function.

Onboard VAA Param Function

Upon reception of the request for verification of the efficiency of the anti-jamming operation, the Onboard VAA Param function is launched. The role of this function is to prepare the parameters necessary for the Communications Channel Power Measurement functions or Communications Channel Acquisition functions. These parameters are:

the identifier of the considered coverage of the satellite, the identifier of the frequency channel of the band B considered, the gain of the digitization chamber of the output of the communications BFN to be used by the Communications Channel Power Measurement functions or Communications Channel Acquisition functions. Nominally, this gain is settled at its minimum value, the function to be launched: Communications Channel Power Measurement functions or Communications Channel Acquisition.

Communications Channel Power Measurement Function:

The Communications Channel Power Measurement function has the following goals:

estimating the available power at output of the digitization chain of the communications BFN (expression (25)), sending the result of the ground.

Communications Channel Acquisition

The Communications Channel Acquisition function has the following aims:

acquiring the samples at the output of the communications BFN, sending the samples to the ground.

VAA Gain Function

On the basis of the results of the Communications Channel Power Measurement function, the VAA Gain function is aimed at optimizing the gain, $G_x$, of the digitization chain of the output of the communications BFN so as to exploit the dynamic range of encoding of the ADC to the maximum extent without saturating it. More specifically, this gain is computed from the results of the Communications Channel Power Measurement, $P_{output}$, of the initial gain of the reception chains, $G_{init}$, and of the characteristics of the ADC (Gain of the ADC $G_{adc}$, Maximum permissible power at input with the margin of 10 dB taken into account $P_{max}$).

If the gain of the digitization chain is considered to be necessarily included between X and Y dB, then the function implements the following processing operations:

Computation of the power associated with the input of the ADC: $P_{input} = P_{output}/G_{adc}$, Comparison of $P_{input}$ and $P_{max}$: $\Delta P = P_{max} - P_{input}$, Computation of the gain of the digitization chain If $\Delta P \geq 0$, $G_x = \text{Inf}[G_{init} + \Delta P, Y \text{ dB}]$ If $\Delta P < 0$, $G_x = \text{Sup}[G_{init} + \Delta P, X \text{ dB}]$ VAA Processing Function For the channel verification mode, the VAA Processing Function implements the operations described in paragraphs IV.A to IV.F.

For the station verification mode, the VAA Processing Function implements the operations described in paragraph IV.G.

What is claimed is:

1. A method for the verification of anti-jamming in a communications system having several sensors or adaptive antennas, comprising the following steps:

estimating a mean power $\hat{\Box}y$ of the output of the communications system, estimating a respective power values Pu or P'u, of a station u, the antenna noise Pa or P'a, the thermal noise PT, or P'T, estimating at least one of the following ratios:

$$J_{tot}/S_{tot} = \left(\sum_{p=1}^{P} P_p\right)\left(\sum_{u=1}^{U} P_u\right)$$

with $p$ = the jamming unit

= sum of the power values of the residual jamming units/sum of the power values of the stations on the reception band $B$ $$J_{tot}/S_u = \left(\sum_{p=1}^{P} P_p\right)/P_u$$

= sum of the power values of the residual jamming units/power of the station $u$ in the reception band $B$.

$$J_u/S_u = \left(\sum_{p=1}^{P} P_{pu}\right)/P_u$$

with Ppu=power of the jamming unit p in the reception band Bu| comparing at least one of the three ratios with a threshold value.

2. The method for the verification of anti-jamming according to claim 1, comprising a step for estimating the mean power $\hat{\Box}y$, for an output from a number K of samples, y(k), $1 \leq k \leq K$ of this output, given by $$\hat{R}_y \triangleq \frac{1}{K}\sum_{k=1}^{K} |y(k)|^2.$$

3. The method for the verification of anti-jamming according to claim 1, comprising a step of estimation $\hat{P}_u$, $\hat{P'}_u$ of the power $P_u P'_u$ in using, firstly, a priori knowledge of the parameters w and $G_{num}$ for a digital application of the adaptive filters and $|\Box|^2$, w and G for an analog application of the filters and secondly the estimation of the parameters $\Box_u$ and $S_u$.

4. The method for the verification of anti-jamming according to claim 1, comprising an estimation $\hat{P}_u$, $\hat{P'}_u$ of the power $P_u$, $P'_u$ in using, firstly, a priori knowledge of the parameters w and $G_{num}$ for a digital application of the adaptive filters and $|\Box|^2$, w and G for an analog application of the filters and secondly the estimation of the parameter $\Box_a$.

5. The method for the verification of anti-jamming according to claim 1, comprising a step of estimation $\hat{P}_u$, $\hat{P'}_u$ of the power $P_u$, $P'_u$ in using, a priori knowledge of the parameters w and $G_{num}$ for a digital application of the adaptive filters and $|\Box|^2$, w and G for an analog application of the filters and secondly the estimation of the parameter $\Box_T$.

6. The method for the verification of anti-jamming according to claim 1, comprising a step of estimation $\hat{J}_{tot}/\hat{S}_{tot}$, of the ratio $J_{tot}/S_{tot}$ given by $$\hat{J}_{tot}/\hat{S}_{tot} = \left(\hat{\pi}_y - \sum_{u=1}^{U}\hat{P}_u - \hat{P}_a - \hat{P}_T\right) \bigg/ \left(\sum_{u=1}^{U}\hat{P}_u\right).$$

7. The method for the verification of anti-jamming according to claim 1, comprising a step of estimation $\hat{J}_{tot}/\hat{S}_u$, of the ratio $J_{tot}/S_u$, given by $$\hat{J}_{tot}/\hat{S}_u = \left(\hat{\pi}_y - \sum_{u=1}^{U}\hat{P}_u - \hat{P}_a - \hat{P}_T\right) \bigg/ \hat{P}_u.$$

8. The method of verification of anti-jamming according to claim 1, comprising a step of estimation $\hat{J}/\hat{S}_u$, of the ratio $J/S_u$ in using the total power of residual jamming units in the $B_u$ band of the working station u given by $$\hat{J}/\hat{S}_u = \left(\hat{\pi}_{yu} - \hat{P}_u - \sum_{v \neq u}\hat{P}_{vu} - \hat{P}_{au} - \hat{P}_{Tu}\right) \bigg/ \hat{P}.$$

9. The method of verification of anti-jamming according to claim 1 comprising a step of determination of the precision of estimation, and wherein this value is used to set the threshold.

10. A use of the method according to claim 1.

\* \* \* \* \*